United States Patent [19]

Fouquer et al.

[11] Patent Number: 4,915,548
[45] Date of Patent: Apr. 10, 1990

[54] CUTTING INSERT WITH RAISED CUTTING EDGE

[75] Inventors: Richard Fouquer; Jocelyn Gibert, both of Tours, France

[73] Assignee: Safety S.A., Cedex, France

[21] Appl. No.: 282,067

[22] Filed: Dec. 9, 1988

[30] Foreign Application Priority Data

Dec. 11, 1987 [FR] France .................. 87 17300

[51] Int. Cl.⁴ ........................................ B23B 27/22
[52] U.S. Cl. ................................................ 407/114
[58] Field of Search ............... 407/113, 114, 115, 116, 407/117

[56] References Cited

U.S. PATENT DOCUMENTS

| 4,214,845 | 7/1980 | Mori ............ 407/114 |
| 4,318,645 | 3/1982 | McCreery ...... 407/114 |
| 4,507,024 | 3/1985 | Stashko ......... 407/114 |
| 4,741,649 | 5/1988 | Mori ............ 407/114 |

FOREIGN PATENT DOCUMENTS

| 3332821 | 5/1984 | Fed. Rep. of Germany ...... 407/114 |
| 3333100 | 9/1984 | Fed. Rep. of Germany ...... 407/114 |

Primary Examiner—Judy Hartman
Assistant Examiner—Blynn Shideler
Attorney, Agent, or Firm—Burns, Doane, Swecker & Mathis

[57] ABSTRACT

A cutting insert for chipforming machining of metal workpieces is disclosed, said insert comprising opposed top and bottom surfaces (11) and (12) and a peripheral wall (13) extending therebetween. The insert has cutting edges at the juncture between at least the top surface and said peripheral wall, a land area (15), and a first descending surface (16) starting from the top inner margin of said land. A number of convexly curved spaced projections (23, 26) being formed on or adjacent said first descending surface, the upper surface of each of said projections being planar and located below the plane defined by the cutting edges (14).

11 Claims, 2 Drawing Sheets

CUTTING INSERT WITH RAISED CUTTING EDGE

BACKGROUND AND OBJECTS OF THE INVENTION

The present invention relates to a cutting insert for chipforming machining of workpieces of metal, and in particular to triangular, square, rhombic, rhomboidic or other forms of indexable cutting inserts used with toolholders. The basic form of such cutting inserts comprises two opposed top and bottom surfaces and a peripheral wall extending therebetween. The cutting edges are formed by the transition between the top surface and the peripheral wall of the insert. The top surface of the insert is a chip face or such a surface which is in contact with the formed chip at the cutting operation, and the peripheral wall being a clearance face in relation to the workpiece.

It is generally desirable that these inserts should have a geometry that will minimize the power required in the metalworking operations by controlling the geometry of the chips produced and that the insert chip control geometry should be capable of controlling chips over a wide range of parameters such as depth of cut or feed rate.

Typical prior art inserts known to applicant are disclosed in U.S. Pat. Nos. 3,815,192 and 3,973,308. In the insert according to the former patent, a plurality of projections are spaced so as to define chip curling zones therebetween, and in the latter patent, a plurality of notches were so formed that the chip could pass or slide over them without being broken or substantially deformed.

The insert of the present invention has a chip face that is modified to have a more favorable form in regard to the cutting forces and to wear of the cutting tool.

THE DRAWINGS

The invention will now be more closely described in connection with the appended drawings showing preferred embodiments of the insert, wherein further characterizing features and advantages will be apparent.

FIG. 1 is a perspective view of an indexable cutting insert according to the invention, FIG. 2 is a plan view of the cutting insert shown in FIG. 1, FIG. 3 is a sectional view taken along the line A-A in FIG. 2, FIG. 4 is a sectional view taken along the line B-B in FIG. 2, and FIG. 5 is a complete cross sectional view taken along the line B—B in FIG. 2.

DETAILED DESCRIPTION OF A PREFERRED EMBODIMENT OF THE INVENTION

Figure 1:
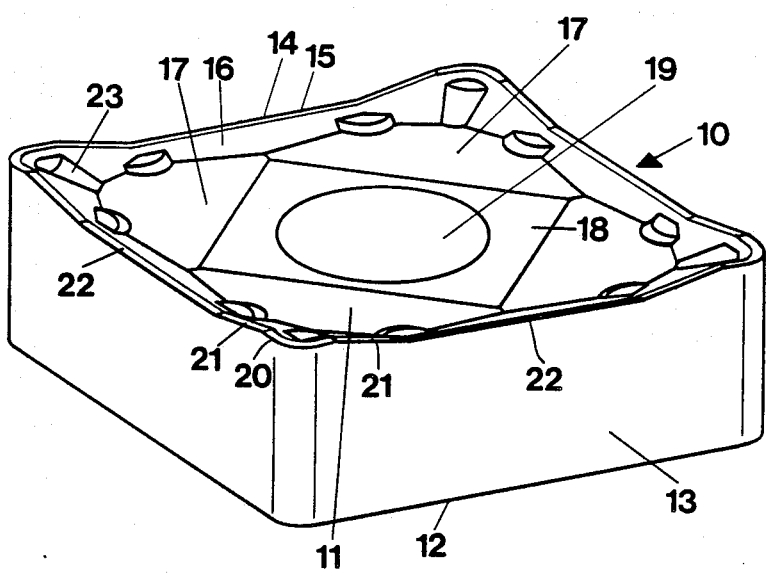
Figure 2:
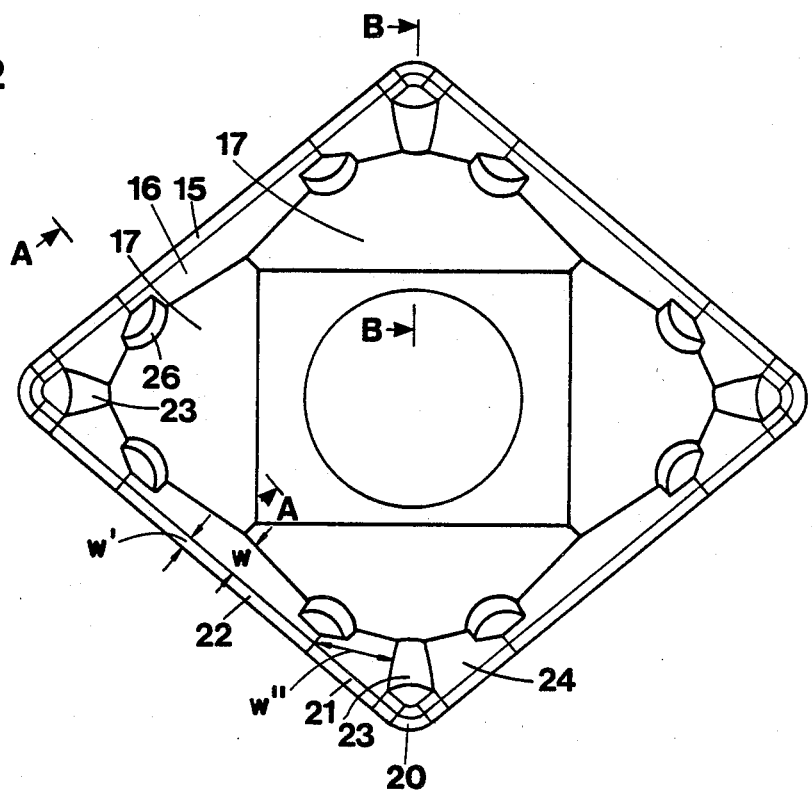

With reference to FIGS. 1-2 the illustrated cutting insert 10, made of hard wear resistant material such as hard metal, includes a top surface 11 and a lower bottom supporting surface 12, and a peripheral wall 13 with rounded corners joining a top surface 11 and bottom surface 12, whereby the wall 13 is in perpendicular relation to the faces 11, 12. The insert 10 further includes a plurality of cutting edges 14 extending along all the edges of the insert at the junction of the peripheral walls and the top surface. Each cutting edge 14 is joined to a cutting edge land area 15 which extends inwardly from the cutting edge. This land area 15 is perpendicular to peripheral walls 13.

A first sloping descending surface 16, 24 extends from the inner margin of the land area 15 and joins a secondary descending surface 17. The secondary descending surface 17 joins a planar floor 18 formed in the central region while oriented parallel with the bottom surface 12 of the insert. This floor is symmetric about the bisectors of the corner angles. This floor is symmetrical to the shape of the insert while offset angularly therefrom. An insert aperture 19 normal to the planar floor 18 is provided in the center of the insert 10 for the receipt of a suitable locking pin employed to clamp the insert to a pocket wall of a tool holder. The edge land area 15 is planar and comprises an elevated corner land area portion 20 at each rounded corner that is located in a plane that is parallel to the planar floor 18. These land area portions 20 have been located so as to reinforce the cutting edge in the difficult areas and decrease the contact between chips and cutting face in order to delay the crater wear effect.

The elevated corner land area portion 20, seen in the direction of the cutting edge 14, joins a sloping land area portion 21 which joins a recessed land area portion 22 which is planar and parallel to the central planar floor 18. Hence, every portion of the cutting edge 14 is at a raised level in relation to the central planar floor 18 of the top surface 11. The first descending surface includes portions 16 each of which has an angle $\alpha_1$, within a range of 15° and 25° and is preferably approximately 20°. The width w of the portion 16 varies such that it is largest in the middle point between two adjacent corners of the insert. As best shown in FIG. 2 the width w of the portion 16 is approximately twice the width w' of the land 15.

In each corner region, in the direction of the bisector, there is provided a sloping convexly curved elongated primary projection 23 which provides a transition between two adjacent surface portions 24 of the first descending surface. The portion 24 joins the portions 16. As also appears from FIG. 2 each of the surface portions 24 is located in a linear plane angularly related to the portion 16 while having a width w'' that decreases towards the middle of the cutting edge. The upper surface portion 25 of said projection is planar and located in a bevel somewhat below the level of the uppermost edge land area portion 20. Secondary extensions 26 are located on each a of said first extension 23 while equally spaced therefrom. These secondary projections are wider and, convexly curved, less than semi circular, the upper portions 27 of which are planar and located at the same level as the upper surface portion 25 of the primary projections 23.

Figure 3:
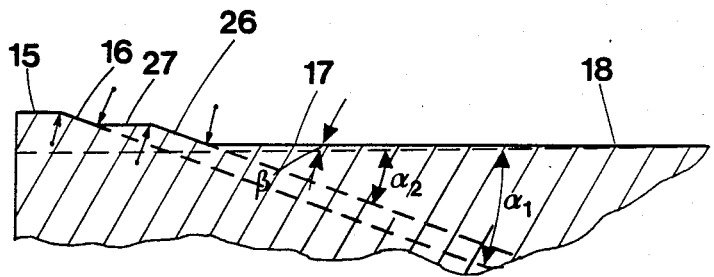

Referring now to FIG. 3, which is a cross section of the insert taken along line A—A in FIG. 2, it can be seen more clearly that the portion 16 of the first descending surface forms an angle $\alpha$ with the plane defined by the land area 15. This angle is in the range 15 to 25 degrees preferably 20°. It can also be seen in this figure that the convex surface of secondary projection 26 is sloping at an angle $\alpha_2$ with a land area 15 that is equal to a first angle $\alpha_1$, i.e. preferably 20°. It also appears that the secondary descending surface 17 is sloping at a much smaller angle $\beta$ towards the planar floor 18, the angle preferably being 2-5 degrees.

Figure 4:
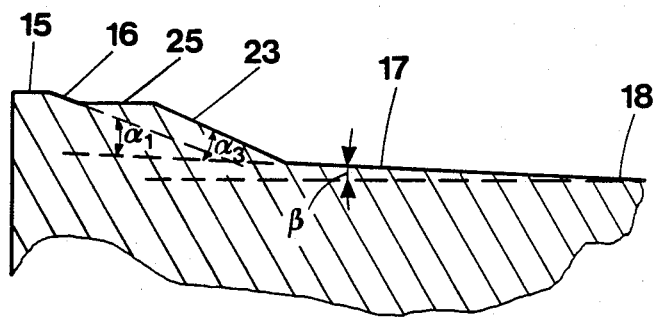

Referring now to FIG. 4, which is a cross section of the insert taken along the line B-B along the bisector in FIG. 2, it can be seen that the portion 16 of the first descending surface meets the upper planar surface 25 of the primary projection 23 at an angle which is uniform with the angle of the portion 16 in FIG. 3, and that the convex surface of the primary projection 23 slopes at an angle $\alpha_3$ that is somewhat larger, in the range 20–30 degrees, preferably 25°, and that the sloping convex surface joins the secondary descending surface 17, whereby the latter slopes at a much smaller angle $\beta$ towards the planar floor 18 which angle is uniform with the angle $\beta$ shown in FIG. 3.

The arrangement should be that the primary extensions 23 should have an elongated form, the length of which is essentially larger, preferably about two times larger than the length of the secondary extensions 26. Further, the secondary extensions 26 should have a width that is larger than the width of the primary extensions 23.

A further distinction is that the distance between a primary extension 23 and each adjacent secondary extension should be smaller than the distance between two adjacent secondary extensions 26. It is generally recommended that the latter distance should be approximately two times larger than the first distance.

Figure 5:
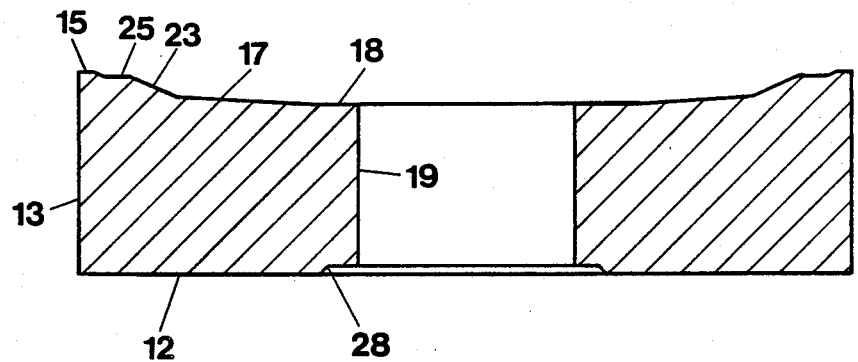

As can be seen from FIG. 5 the bottom surface 12 of the insert 10 is provided with a central recess 28 such that the remaining surface portions of the bottom surface 12 becomes abutment surfaces for abutment against the base surface of an insert receiving pocket in a tool holder. By this formation the insert becomes more stable and wobble-free.

I claim:

1. A cutting insert for chipforming machining of metal workpieces comprising a polygonal body of wear resistant material, said body including top and bottom surfaces, and a plurality of peripheral walls extending therebetween, the intersection of said peripheral walls and at least said top surface forming cutting edge means, said top surface including:
   a land area joining said cutting edge means and extending inwardly therefrom toward a center of said body, said land area including:
      corner portions disposed at respective corners of said body,
      a recessed portion disposed between adjacent corner portion at a lower elevation than said corner portions, said recessed portion lying parallel to said corner portions, and
      sloping portions inclined downwardly from said corner portions to said recessed portion,
   descending surface means joining an inner margin of said land area and descending therefrom toward said center of said body,
   primary projections disposed in said descending surface means at respective corners of said body, said primary projections being convex and sloping downwardly and inwardly and each including a planar upper surface located at an elevation between an adjacent section of said cutting edge means, and
   secondary projections disposed in said descending surface means, said secondary projections being convex and sloping downwardly and inwardly, and each including a planar upper surface located at an elevation below an adjacent section of said cutting edge means, said secondary projections being spaced from respective ones of said primary projections in a direction toward adjacent corners of said body to define chip curling zones between said primary and secondary projections.

2. Cutting insert according to claim 1, wherein each of said primary projections extends along a bisector of its respective corner for a length longer than a length of each of said secondary projections.

3. Cutting insert according to claim 2, wherein each of said primary projections has a width which extends perpendicular to its respective corner bisector and which is smaller than a width of each of said secondary projections.

4. Cutting insert according to claim 1, wherein two adjacent secondary projections are spaced apart along a respective cutting edge, a portion of said descending surface means disposed between said two adjacent secondary projections having a dimension extending in a direction from said land area toward said center of said body dimension of said land area in the same direction.

5. Cutting insert according to claim 1, wherein said descending surface means includes a first portion disposed between adjacent corners of said body, and pairs of second portions disposed on opposite sides of a bisector of a respective corner.

6. Cutting insert according to claim 5, wherein each secondary projection is disposed at an intersection between said first and second portions of said descending surface means.

7. Cutting insert according to claim 6 including an additional descending surface means extending downwardly and inwardly from an inner margin of said first-named descending surface means, said first descending surface means descending at a first angle which is larger than a second angle at which said first-named descending surface means descends, and a planar floor joining an inner margin of said second descending surface means.

8. Cutting insert according to claim 7, wherein said first angle is from 15 to 25 degrees.

9. Cutting insert according to claim 8, wherein said second angle is from 2 to 5 degrees.

10. Cutting insert according to claim 1, wherein said land area is of uniform width in a direction from said cutting edge to said center of said body, said land area being perpendicular to said peripheral walls, said corner portions of aid land area being coplanar.

11. Cutting insert according to claim 1, wherein said upper surfaces of said primary projections are coplanar with said upper surfaces of said secondary projections.

* * * * *